US012647820B2

(12) United States Patent
Xu et al.

(10) Patent No.: US 12,647,820 B2
(45) Date of Patent: Jun. 2, 2026

(54) METHOD AND APPARATUS FOR ADJUSTING ATTRIBUTE PARAMETER, AND COMMUNICATION DEVICE

(71) Applicant: GUANGDONG OPPO MOBILE TELECOMMUNICATIONS CORP., LTD., Dongguan (CN)

(72) Inventors: Yang Xu, Dongguan (CN); Jingran Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 360 days.

(21) Appl. No.: 18/353,687

(22) Filed: Jul. 17, 2023

(65) Prior Publication Data

US 2023/0362712 A1      Nov. 9, 2023

Related U.S. Application Data

(63) Continuation of application No. PCT/CN2021/073382, filed on Jan. 22, 2021.

(51) Int. Cl.
*H04W 28/02*      (2009.01)
*H04W 76/10*      (2018.01)

(52) U.S. Cl.
CPC ....... *H04W 28/0268* (2013.01); *H04W 76/10* (2018.02)

(58) Field of Classification Search
CPC ............. H04W 28/0268; H04W 76/10; H04W 28/0205; H04W 28/0263; H04W 28/0831
See application file for complete search history.

(56) References Cited

U.S. PATENT DOCUMENTS

| | | |
|---|---|---|
| 2015/0003246 A1 | 1/2015 | Chandramouli et al. |
| 2015/0103670 A1* | 4/2015 | Wu ...................... H04L 47/808 |
| | | 370/236.1 |
| 2019/0313277 A1 | 10/2019 | Huang-Fu et al. |
| 2020/0112907 A1 | 4/2020 | Dao et al. |
| 2022/0159504 A1* | 5/2022 | Wei ................... H04W 28/0268 |
| 2022/0225439 A1* | 7/2022 | Jin ........................ H04W 76/14 |
| 2023/0224754 A1* | 7/2023 | Guo ................. H04W 28/0268 |

(Continued)

FOREIGN PATENT DOCUMENTS

| | | |
|---|---|---|
| CN | 109246173 | 1/2019 |
| CN | 110636559 | 12/2019 |

(Continued)

OTHER PUBLICATIONS

EPO, Extended European Search Report for EP Application No. 21920314.8, Jan. 22, 2024.

(Continued)

*Primary Examiner* — Ayaz R Sheikh
*Assistant Examiner* — Mang Boi Thawng
(74) *Attorney, Agent, or Firm* — Hodgson Russ LLP

(57) ABSTRACT

Embodiments of the present application provide a method and apparatus for adjusting an attribute parameter, and a communication device. The method comprises: a first device receives first information sent by a first core network element, the first information being used for adjusting, by the first device, a transmission attribute parameter corresponding to first service data.

17 Claims, 7 Drawing Sheets

The first core network element sends first information to the first device, and the first device receives the first information sent by the first core network element, and the first information is used by the first device to adjust the transmission attribute parameter corresponding to the first service data

401

(56)         References Cited

U.S. PATENT DOCUMENTS

2023/0224763 A1*   7/2023   Xu ........................ H04W 28/24
                                                    370/328
2023/0276344 A1*   8/2023   Dao .................. H04M 15/8016
                                                    370/329

FOREIGN PATENT DOCUMENTS

CN        110999355      4/2020
WO        2019062783     4/2019

OTHER PUBLICATIONS

"3rd Generation Partnership Project; Technical Specification Group Services and System Aspects; Study on traffic characteristics and performance requirements for AI/ML model transfer in 5GS (Release 18)," 3GPP TR 22.874, Nov. 2020, v0.2.0.
"3rd Generation Partnership Project; Technical Specification Group Services and System Aspects; System architecture for the 5G System (5GS); Stage 2 (Release 16)," 3GPP TS 23.501, Dec. 2020, v16.7.0.
WIPO, International Search Report and Written Opinion for PCT/CN2021/073382, Oct. 14, 2021.

* cited by examiner

100

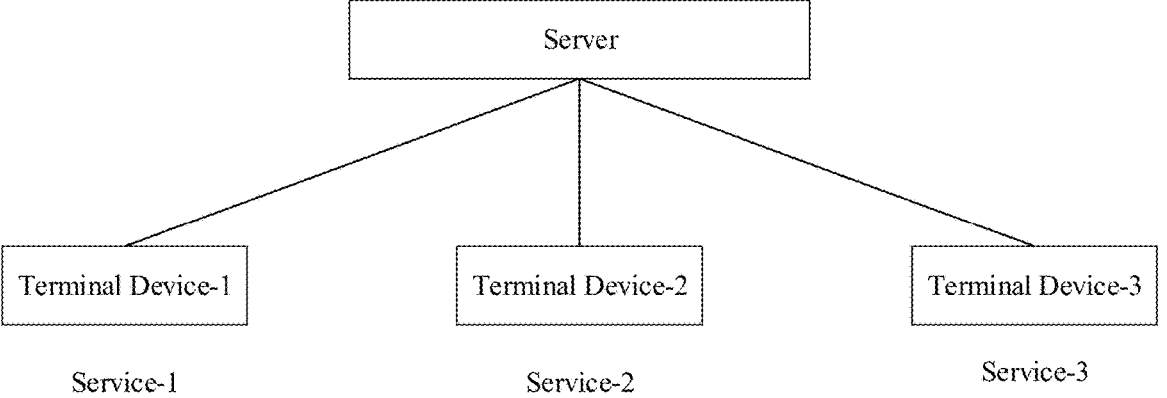
FIG. 3
The first core network element sends first information to the first device, and the first device receives the first information sent by the first core network element, and the first information is used by the first device to adjust the transmission attribute parameter corresponding to the first service data
401
FIG. 4
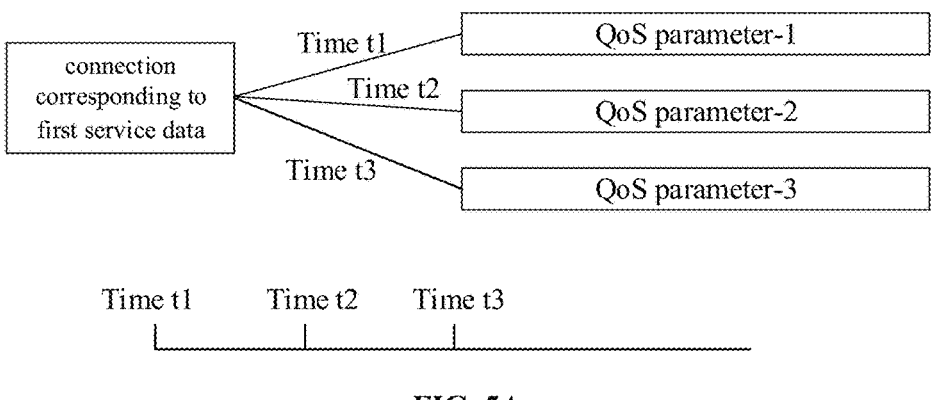
FIG. 5A

METHOD AND APPARATUS FOR ADJUSTING ATTRIBUTE PARAMETER, AND COMMUNICATION DEVICE

CROSS REFERENCE

The present application is a continuation application of International Application No. PCT/CN2021/073382, filed on Jan. 22, 2021, the entire disclosure of which is incorporated herein by reference.

TECHNICAL FIELD

The embodiments of the present application relate to the technical field of mobile communication, and in particular to a method and device for adjusting attribute parameter, and a communication device.

BACKGROUND

When transmitting data between the terminal device and the application server, the connection between the terminal device and the application server needs to be maintained at an ideal quality of service (QoS). The QoS of the connection is reflected by the transmission attribute parameters of the connection.

SUMMARY

Embodiments of the present application provide a method and device for adjusting an attribute parameter, and a communication device.

The method for adjusting attribute parameter provided in the embodiment of the present application includes:

receiving, by a first device, first information sent by a first core network element, wherein the first information is used by the first device to adjust a transmission attribute parameter corresponding to first service data.

The method for adjusting attribute parameter provided in the embodiment of the present application includes:

sending, by a first core network element, first information to a first device, wherein the first information is used by the first device to adjust a transmission attribute parameter corresponding to first service data.

The apparatus for adjusting attribute parameter provided in the embodiment of the present application is applied to a first device, and the apparatus includes:

a receiving unit, configured to receive first information sent by a first core network element, wherein the first information is used by the first device to adjust a transmission attribute parameter corresponding to first service data.

The apparatus for adjusting attribute parameter provided in the embodiment of the present application is applied to a first core network element, and the apparatus includes:

a sending unit, configured to send first information to a first device, wherein the first information is used by the first device to adjust a transmission attribute parameter corresponding to first service data.

The communication device provided in the embodiment of the present application includes a processor and a memory. The memory is used for storing computer programs, and the processor is used for invoking and running the computer programs stored in the memory, and executing the above-mentioned method for adjusting attribute parameter.

The chip provided by the embodiment of the present application is used to realize the above-mentioned method for adjusting attribute parameter.

Specifically, the chip includes: a processor, configured to call and run a computer program from a memory, so that the device installed with the chip executes the above-mentioned method for adjusting attribute parameter.

The computer-readable storage medium provided by the embodiment of the present application is used for storing a computer program, and the computer program enables a computer to execute the above method for adjusting attribute parameter.

The computer program product provided by the embodiments of the present application includes computer program instructions, and the computer program instructions cause a computer to execute the above method for adjusting attribute parameter.

The computer program provided by the embodiment of the present application, when running on a computer, enables the computer to execute the above method for adjusting attribute parameter.

BRIEF DESCRIPTION OF THE DRAWINGS

The drawings described here are used to provide a further understanding of the application and constitute a part of the application. The schematic embodiments and descriptions of the application are used to explain the application and do not constitute an improper limitation to the application. In the drawings:

FIG. 3 is a schematic diagram of communication between three terminal devices and a server provided by the embodiment of the present application;

FIG. 4 is a schematic flowchart of an attribute parameter adjustment method provided by an embodiment of the present application;

FIG. 5A is a schematic diagram of adjusting QoS parameters at different time points provided by the embodiment of the present application;

DETAILED DESCRIPTION

Hereinafter, the technical solutions in the embodiments of the present application will be described with reference to the drawings in the embodiments of the present application. Obviously, the described embodiments are part of the embodiments of the present application, but not all of the embodiments. With regard to the embodiments in this application, all other embodiments obtained by persons of ordinary skill in the art without making creative efforts belong to the scope of protection of this application.

The technical solution of the embodiment of the present application can be applied to various communication systems, for example: Long Term Evolution (LTE) system, LTE Frequency Division Duplex (FDD) system, LTE Time Division Duplex (TDD) systems, 5G communication systems or future communication systems, and the like.

Figure 1:
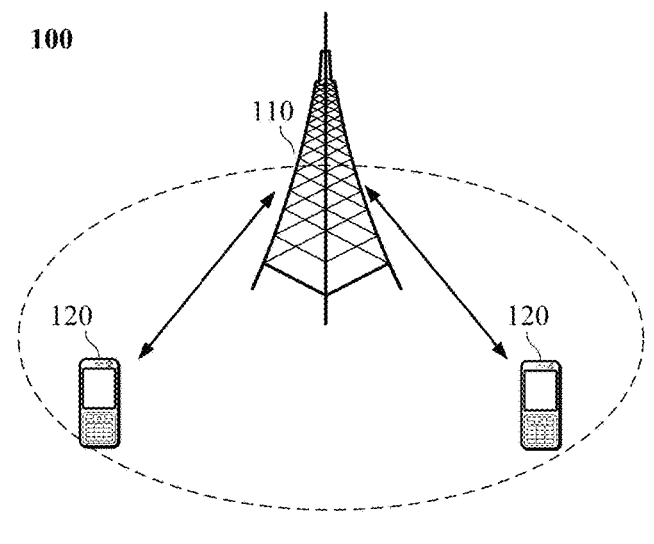
FIG. 1 is a schematic diagram of a communication system architecture provided by an embodiment of the present application.

Exemplarily, a communication system 100 applied in this embodiment of the application is shown in FIG. 1. The communication system 100 may include a network device 110, and the network device 110 may be a device for communicating with a terminal 120 (or referred to as a communication terminal, terminal). The network device 110 can provide communication coverage for a specific geographic area, and can communicate with terminals located in the coverage area. Optionally, the network device 110 may be an evolved base station (Evolutional Node B, eNB or eNodeB) in an LTE system, or a wireless controller in a cloud radio access network (CRAN), Or the network device may be a mobile switching center, a relay station, an access point, a vehicle-mounted device, a wearable device, a hub, a switch, a bridge, a router, a network-side device in a 5G network, or a network device in a future communication system.

The communication system 100 further includes at least one terminal 120 located inside a coverage area of the network device 110. The "terminal" used herein includes, but is not limited to a device that is configured to receive/transmit communication signals via a wired connection, such as via a public switched telephone network (PSTN), digital subscriber line (DSL), digital cable, direct cable connection, and/or another data connection/network, and/or via a wireless interface with, for example, a cellular network, a wireless local area network (WLAN), a digital television network such as a DVB-H network, a satellite network, an AM/FM broadcast transmitter, and/or another terminal; and/or an Internet of Things (IoT) device. A terminal configured to communicate through a wireless interface may be referred to as a "wireless communications terminal", "wireless terminal" or "mobile terminal". Examples of the mobile terminal include, but are not limited to, a satellite or a cellular telephone; a personal communications system (PCS) terminal that may combine a cellular radiotelephone with data processing, facsimile and data communication capabilities; a personal digital assistant (PDA) that can include a radiotelephone, a pager, Internet/Intranet access, a web browser, a notepad, a calendar, and/or a global positioning system (GPS) receiver; and a conventional laptop and/or palmtop receiver or another electronic device that includes a radiotelephone transceiver. A terminal may be an access terminal, user equipment (User Equipment, UE), a subscriber unit, a subscriber station, a mobile station, a mobile, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, a terminal in a future evolved PLMN or the like.

Optionally, direct device to device (Device to Device, D2D) communication may be performed between terminals 120.

Optionally, the 5G communication system or the 5G network may also be called a New Radio (New Radio, NR) system or an NR network.

FIG. 1 exemplarily shows a network device and two terminals. Optionally, the communication system 100 may include multiple network devices and each network device may include other numbers of terminals within the coverage area of the present application, which is not limited by the embodiment of the present application.

Optionally, the communication system 100 may further include other network entities such as a network controller and a mobility management entity, which is not limited in this embodiment of the present application.

It should be understood that a device with a communication function in the network/system in the embodiment of the present application may be referred to as a communication device. Taking the communication system 100 shown in FIG. 1 as an example, the communication device may include a network device 110 and a terminal 120 with a communication function, and the network device 110 and the terminal 120 may be the specific devices described above, which will not be repeated here. The communication device may also include other devices in the communication system 100, such as network controllers, mobility management entities and other network entities, which are not limited in this embodiment of the present application.

It should be understood that the terms "system" and "network" are often used interchangeably herein. The term "and/or" in this article is just an association relationship describing associated objects, which means that there can be three relationships, for example, A and/or B can mean the three cases of: A exists alone, A and B exist simultaneously, and B exists alone. In addition, the character "I" in this article generally indicates that the contextual objects are an "or" relationship.

To facilitate understanding of the technical solutions of the embodiments of the present application, the following describes the technical solutions related to the embodiments of the present application.

QoS Mechanism

Figure 2:
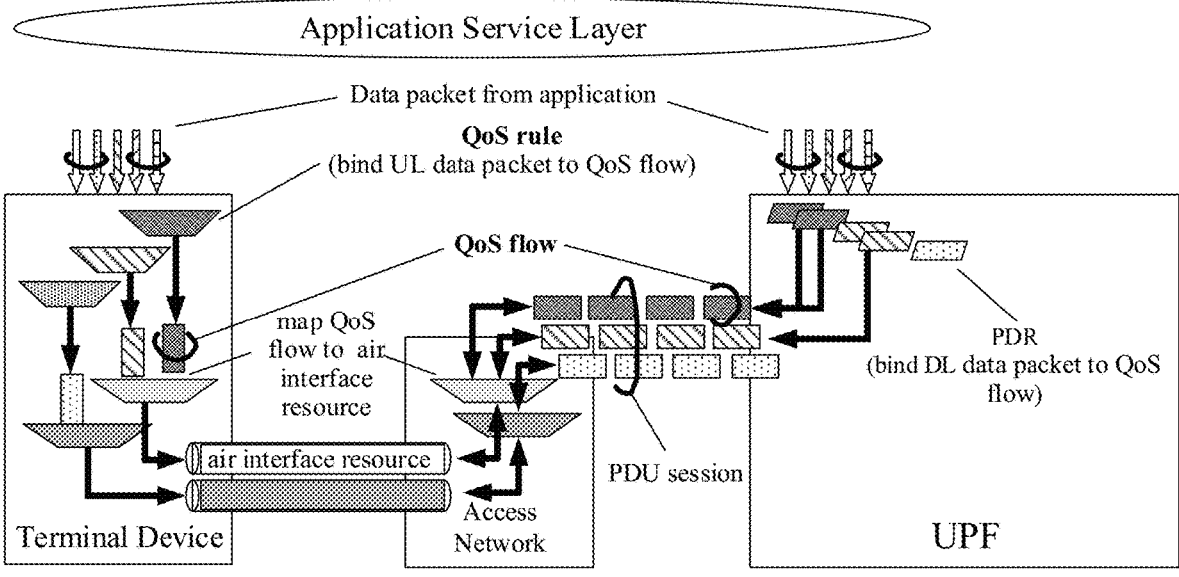
FIG. 2 is a schematic diagram of a QoS flow provided by an embodiment of the present application.

In order to guarantee the transmission quality, a QoS mechanism is needed. As shown in FIG. 2, in a mobile communication network, in order to be able to transmit user plane data, one or more QoS flows (QoS Flows) need to be established. As an important measure of communication quality, QoS parameters are usually used to indicate the characteristics of QoS flows, and different QoS flows correspond to different QoS parameters. QoS parameters may include but not limited to: 5G service quality identifier (5G QoS Identifier, 5QI), Allocation Retension Priority (ARP), Guaranteed Flow Bit Rate (GFBR), Maximum Flow Bit Rate (MFBR), Uplink/Downlink Maximum Packet Loss Rate (UL/DL MPLR), end-to-end packet delay budget (Packet Delay Budget, PDB), AN-PDB, packet error rate (PER), priority level, average window, resource type, Maximum Data Burst Volume (MDBV), UE Aggregate Maximum Bit Rate (UE-AMBR), Session Aggregate Maximum Bit Rate (Session-AMBR), etc.

Rules related to QoS parameters can be implemented through one or more different filters, each filter can contain characteristic parameters describing data packets, and is used to filter out specific data packets to bind to specific QoS flow. Wherein, the rules installed on the terminal device to bind the uplink Qos flow and application data packets are referred to as QoS rules, and the rules installed on the user plane functional network element (User Plane Function, UPF) to bind the downlink QoS flow and application data packets are referred to as Packet Detection Rules (PDR). Here, the characteristic parameters describing the data packet included in the commonly used filter are IP quintuples (i.e., the five-tuple), namely source IP address, destination IP address, source port number, destination port number and protocol type. The UPF and the terminal device will form a filter according to the combination of the characteristic parameters of the data packet (the leftmost trapezoid and the rightmost parallelogram in FIG. 2 represent the filter), and filter uplink or downlink data packet transmitted on the user plane satisfying the characteristics, and bind the packet to a certain QoS flow. The uplink QoS flow is bound by the terminal device, and the downlink QoS flow is bound by the network side (such as UPF). In the QoS mechanism, one or more QoS flows may be mapped to an air interface resource for transmission. As an example, the air interface resource may be a data radio bearer (DRB). For a QoS flow, corresponding to a set of QoS parameters, the access network will establish a DRB according to the QoS parameters and bind the QoS flow to a specific DRB.

QoS flow is triggered by session management function network element (Session Management Function, SMF). When the QoS needs to be adjusted, both the terminal device and the network side can trigger the PDU session modification process, thereby changing the QoS. Taking the terminal device as an example, the terminal device can modify the QoS parameters of the QoS flow or establish a new QoS flow by sending a PDU session modification request message. That is to say, when the terminal device adjusts the QoS, it needs to execute a session modification process, and must obtain the consent of the network. Because the PDU session modification process takes a long time, and there is no guarantee that the modification will be successful, it will affect the behavior of the application, that is, the application cannot accurately determine whether and how long it can use the QoS it wants, which will have a greater impact for many real-time services, such as machine learning, neural network analysis, etc. There are also many situations that cause QoS changes. As an example, the following situations can cause QoS changes: 1) Base station switching occurs; 2) Network congestion occurs (such as a sudden increase in the number of users) 3) Terminal device moves into or out of a specific range (such as the service range of the edge server).

At present, once the QoS parameters are configured, the QoS parameters cannot be changed unless the network side instructs or the radio resources change. The following uses a scenario to illustrate that QoS parameters need to be changed. It should be noted that the technical solutions of the embodiments of the present application are not limited to the following scenario, and the technical solutions of the embodiments of the present application can be applied to any other scenarios where QoS parameters need to be changed.

Referring to FIG. 3, terminal device-1, terminal device-2, and terminal device-3 are respectively connected to the server, download model update data from the server, and upload the training results to the server. When the terminal device-1, the terminal device-2, and the terminal device-3 are uploading or downloading data, the connection with the server needs to be maintained at an ideal QoS. However, due to the limited air interface resources, the network cannot guarantee certain QoS parameters for the three terminal devices at the same time. Therefore, the method of alternately guaranteeing QoS parameters can be adopted, that is, when terminal device-1 transmits data, it is guaranteed to have a better QoS parameters (such as GBR=100M), at this time, terminal device-2 and terminal device-3 can use poor QoS parameters (such as GBR=10M), so as to save air interface resources. Similarly, terminal device-2 is guaranteed to have better QoS parameters when transmitting data, and at this time, terminal device-1 and terminal device-3 can use poorer QoS parameters. Similarly, terminal device-3 is guaranteed to have better QoS parameters when transmitting data, and at this time, terminal device-1 and terminal device-2 can use poorer QoS parameters.

A possible use of the above scenario is for asynchronous federated learning or asynchronous distributed learning, but not limited thereto. For a certain terminal device in the above scenario, the QoS parameter of the terminal device will change according to the actual data transmission situation. Further, if data is periodically transmitted between the terminal device and the server, the concept of periodic QoS may be introduced, that is, the QoS parameters of the terminal device are periodically adjusted. For some scenarios with large periodicity and data burst, it is only necessary to guarantee specific QoS parameters periodically, so as to achieve the purpose of saving air interface resources. It should be noted that the "QoS parameter of the terminal device" here refers to "the QoS parameter corresponding to the connection between the terminal device and the server".

In order to realize the flexible adjustment of QoS parameters, the following technical solutions of the embodiments of the present application are proposed.

It should be noted that the technical solutions of the embodiments of the present application can be applied to any communication system, including but not limited to 5G system (5GS), 6G system (6GS), and the like.

FIG. 4 is a schematic flow chart of an attribute parameter adjustment method provided in an embodiment of the present application. As shown in FIG. 4, the attribute parameter adjustment method includes the following steps:

Step 401: The first core network element sends first information to the first device, and the first device receives the first information sent by the first core network element, and the first information is used by the first device to adjust the transmission attribute parameter corresponding to the first service data.

In this embodiment of the present application, the first core network element is a core network control plane network element. As an example, in 5GS, the first core network element is an SMF.

In the embodiment of the present application, the transmission attribute parameter is used to guarantee the transmission quality of the first service data. As an example, in 5GS, the transmission attribute parameter is a QoS parameter.

In this embodiment of the present application, the first device is a terminal device, or a base station, or a second core network element. Here, the second core network element is a core network user plane network element. As an example, in 5GS, the second core network element is a UPF.

Taking the first device as a terminal device as an example, the terminal device binds the first service data to an uplink connection according to a rule for transmission. In 5GS, the rules that terminal devices follow are called QoS rules. The terminal device can determine the uplink QoS flow corresponding to the first service data according to the QoS rules, and bind the first service data to the uplink QoS flow for transmission. It should be noted that different QoS flows correspond to different QoS parameters. The terminal device may adjust the QoS parameter corresponding to the first service data according to the first information.

Taking the UPF as the first device as an example, the UPF binds the first service data to a certain downlink connection for transmission according to a rule. In 5GS, the rule UPF is based on is referred to as PDR. The UPF can determine the downlink QoS flow corresponding to the first service data according to the PDR, and bind the first service data to the downlink QoS flow for transmission. It should be noted that different QoS flows correspond to different QoS parameters. The UPF may adjust the QoS parameter corresponding to the first service data according to the first information.

The specific implementation of the first information issued by the first core network element will be described below.

Implementation One

In some optional embodiments of the present application, the first information includes: first condition information, the first condition information is used to determine the adjustment condition; and first parameter information, the first parameter information is used to determine an adjusted transmission attribute parameter.

In the embodiment, the adjustment condition includes but is not limited to at least one of the following: time, location, and load.

As an example, the adjustment condition is time, that is, when the time condition is met, the first device adjusts the transmission attribute parameter corresponding to the first service data. In the embodiment, the fulfillment of the time condition is, for example, that the current time reaches a specified time point, or that the current time is within a specified time period.

As an example, the adjustment condition is location, that is, when the location condition is met, the first device adjusts the transmission attribute parameter corresponding to the first service data. In the embodiment, the fulfillment of the location condition is, for example, that the current location of the first device is located at a specified area, or that the current location of the first device is located within a specified area range.

As an example, the adjustment condition is load, that is, when the load condition is met, the first device adjusts the transmission attribute parameter corresponding to the first service data. In the embodiment, the fulfillment of the load condition is, for example, that the load of the first service data or the load of the connection corresponding to the first service data is greater than or equal to a first threshold, or the load of the first service data or the load of the connection corresponding to the first service data is less than or equal to a second threshold. It should be noted that the connection corresponding to the first service data refers to the connection used to transmit the first service data, and it can also be understood that the first service data is bound to the corresponding connection for transmission.

In the embodiment, the adjusted transmission attribute parameter may be a QoS parameter. It should be noted that the adjusted QoS parameter may include one or more parameters. The QoS parameters include but are not limited to at least one of the following: 5QI, ARP, GFBR, MFBR, UL/DL MPLR, end-to-end PDB, AN-PDB, PER, priority level, average window, resource type, MDBV, UE-AMBR, and Session-AMBR.

In some optional embodiments, the first condition information includes at least one of the following: at least one time point information for adjustment; at least one time period information for adjustment; cycle length information for adjustment.

In one case, the first condition information is used to determine at least one time point for adjustment; and the first parameter information is used to determine a transmission attribute parameter that needs to be adjusted corresponding to each time point in the at least one time point. Based on this, the first device adjusts the transmission attribute parameter of the connection corresponding to the first service data based on the first condition information and the first parameter information.

In an example, referring to FIG. 5A, the first condition information is used to indicate three time points, namely time t1, time t2, and time t3. The first parameter information is used to indicate that the transmission attribute parameter that needs to be adjusted corresponding to time t1 is QoS parameter-1, the transmission attribute parameter that needs to be adjusted corresponding to time t2 is QoS parameter-2, and the transmission attribute parameter that needs to be adjusted corresponding to time t3 is QoS parameter-3. After the first device obtains the first information, it adjusts the transmission attribute parameter of the connection corresponding to the first service data to QoS parameter-1 from time t1, adjusts the transmission attribute parameter of the connection corresponding to the first service data to QoS parameter-2 from time t2, and adjusts the transmission attribute parameter of the connection corresponding to the first service data to QoS parameter-3 from time t3. It should be noted that the connection corresponding to the first service data refers to the connection used to transmit the first service data, and it can also be understood that the first service data is bound to the corresponding connection for transmission.

Further, optionally, the at least one time point is periodic in time. Based on this, the first device periodically adjusts the transmission attribute parameters of the connection corresponding to the first service data based on the first condition information and the first parameter information.

Figure 5B:
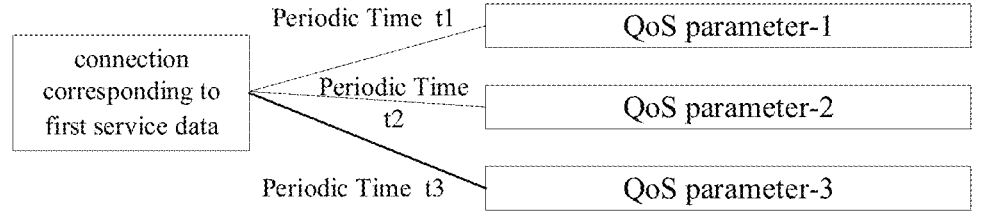
FIG. 5B is a schematic diagram of periodically adjusting QoS parameters at different time points provided by the embodiment of the present application.
Figure 5B:
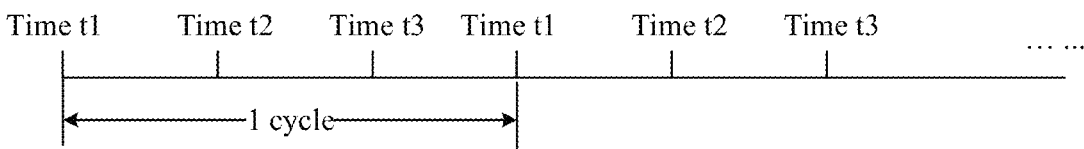

In one example, referring to FIG. 5B, the difference between FIG. 5B and FIG. 5A is that time t1, time t2, and time t3 are periodic, and the period length is T. It can be understood that the time t1 in the nth cycle is actually time $t1+(n-1)T$, the time t2 in the nth cycle is actually time $t2+(n-1)T$, and the time t3 in the nth cycle is actually is time $t3+(n-1)T$. For each period, the first device will adjust the transmission attribute parameters. Specifically, in each period, the first device will adjust the transmission attribute parameters of the connection corresponding to the first service data to the QoS parameters-1 from time t1, adjust the transmission attribute parameter of the connection corresponding to the first service data to QoS parameter-2 from time t2, and adjust the transmission attribute parameter of the connection corresponding to the first service data to QoS parameter-3 from time t3.

In another case, the first condition information is used to determine at least one time period for adjustment; the first parameter information is used to determine the corresponding transmission attribute that needs to be adjusted in each time period of the at least one time period parameter. Based on this, the first device adjusts the transmission attribute parameter of the connection corresponding to the first service data based on the first condition information and the first parameter information.

Figure 5C:
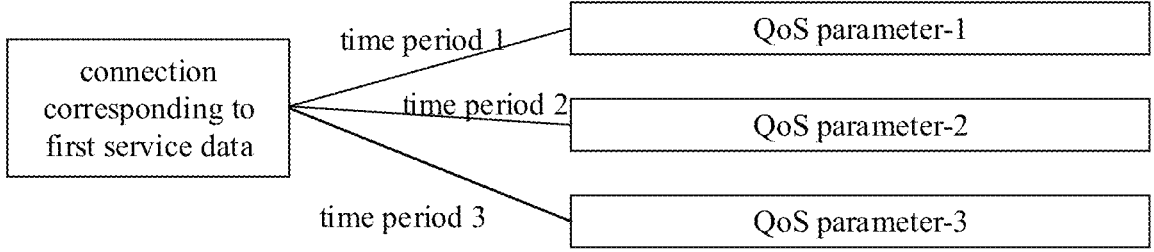
FIG. 5C is a schematic diagram of adjusting QoS parameters in different time periods provided by the embodiment of the present application.
Figure 5C:
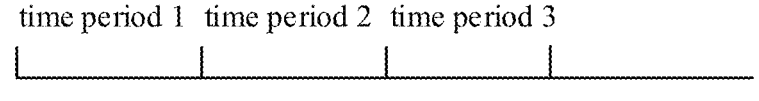

In an example, referring to FIG. 5C, the first condition information is used to indicate three time periods, namely time period 1, time period 2, and time period 3. The first parameter information is used to indicate that the transmission attribute parameter that needs to be adjusted corresponding to time period 1 is QoS parameter-1, the transmission attribute parameter that needs to be adjusted corresponding to time period 2 is QoS parameter-2, and the transmission attribute parameter that needs to be adjusted corresponding to time period 3 is QoS parameter-3. After obtaining the first information, the first device adjusts the transmission attribute parameter of the connection corresponding to the first service data to QoS parameter-1 during time period 1, and adjusts the transmission attribute parameter of the connection corresponding to the first service data to QoS parameter-2 during time period 2, and adjusts the transmission attribute parameter of the connection corresponding to the first service data to QoS parameter-3 during time period 3.

Further, optionally, the at least one period of time is periodic in time. Based on this, the first device periodically adjusts the transmission attribute parameters of the connection corresponding to the first service data based on the first condition information and the first parameter information.

Figure 5D:
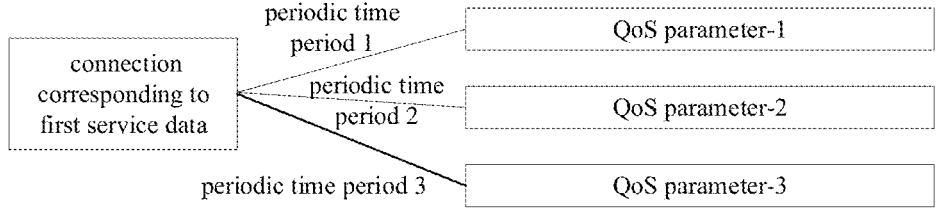
FIG. 5D is a schematic diagram of periodically adjusting QoS parameters in different time periods provided by the embodiment of the present application.
Figure 5D:
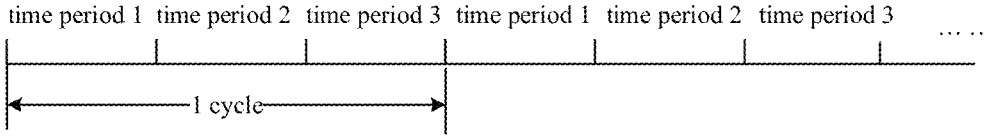

In one example, referring to FIG. 5D, the difference between FIG. 5D and FIG. 5C is that time period 1, time period 2, and time period 3 are periodic, and the period length is T. It can be understood that the start time of time period 1 in the nth cycle is actually time $t1+(n-1)T$, t1 is the start time of time period 1 in the first cycle; the start time of time period 2 in the nth cycle is actually time $t2+(n-1)T$, t2 is the start time of time period 2 in the first cycle; and the start time of time period 3 in the nth cycle is actually time $t3+(n-1)T$, t3 is the start time of time period 3 in the first cycle. For each cycle, the first device will adjust the transmission attribute parameters. Specifically, in each cycle, the first device will adjust the transmission attribute parameter of the connection corresponding to the first service data to QoS parameter-1 during time period 1, adjust the transmission attribute parameter of the connection corresponding to the first service data to QoS parameter-2 during time period 2, and adjust the transmission attribute parameter of the connection corresponding to the first service data to QoS parameter-3 during time period 3.

Implementation Two

In some optional embodiments of the present application, the first information includes: first condition information, the first condition information is used to determine the adjustment condition; and second parameter information, the second parameter information is used to determine a rule of the adjustment, the rule is used to determine the connection corresponding to the first service data.

It should be noted that the connection corresponding to the first service data refers to the connection used to transmit the first service data, and it can also be understood that the first service data is bound to the corresponding connection for transmission.

The first device may determine the connection corresponding to the first service data according to the rule, that is, determine the binding relationship between the first service data and the connection, and bind the first service data to the corresponding connection for transmission. When the rule is adjusted, the binding relationship between the first service data and the connection is adjusted accordingly, so the first device can adjust the connection corresponding to the first service data according to the adjusted rule.

As an example, in 5GS, the rule that the terminal device is based on is referred to as a QoS rule. The terminal device can determine the uplink QoS flow corresponding to the first service data according to the QoS rule, and bind the first service data to the uplink QoS flow for transmission. The rule on which the UPF is based is referred to as a PDR, and the UPF can determine the downlink QoS flow corresponding to the first service data according to the PDR, and bind the first service data to the downlink QoS flow for transmission.

In the embodiment, the adjustment conditions include but are not limited to at least one of the following: time, location, and load.

As an example, the adjustment condition is time, that is, when the time condition is met, the first device adjusts the connection corresponding to the first service data according to the adjusted rule. In the embodiment, the fulfillment of the time condition is, for example, that the current time reaches a specified time point, or that the current time is within a specified time period.

As an example, the adjustment condition is location, that is, when the location condition is met, the first device adjusts the connection corresponding to the first service data according to the adjusted rule. In the embodiment, the fulfillment of the location condition is, for example, that the current location of the first device is located at a specified area, or that the current location of the first device is located within a specified area range.

As an example, the adjustment condition is load, that is, when the load condition is met, the first device adjusts the connection corresponding to the first service data according to the adjusted rule. In the embodiment, the fulfillment of the load condition is, for example, that the load of the first service data or the load of the connection corresponding to the first service data is greater than or equal to a first threshold, or the load of the first service data or the load of the connection corresponding to the first service data is less than or equal to a second threshold.

In some optional embodiments, the first condition information includes at least one of the following: at least one time point information for adjustment; at least one time period information for adjustment; cycle length information for adjustment.

In one case, the first condition information is used to determine at least one time point for adjustment; and the second parameter information is used to determine a rule that needs to be adjusted corresponding to each time point in the at least one time point. Based on this, the first device adjusts the connection corresponding to the first service data based on the first condition information and the second parameter information. In the embodiment, since the connection is corresponded to the transmission attribute parameter, it in turn realizes the adjustment of the transmission attribute parameter of the first service data.

Figure 6A:
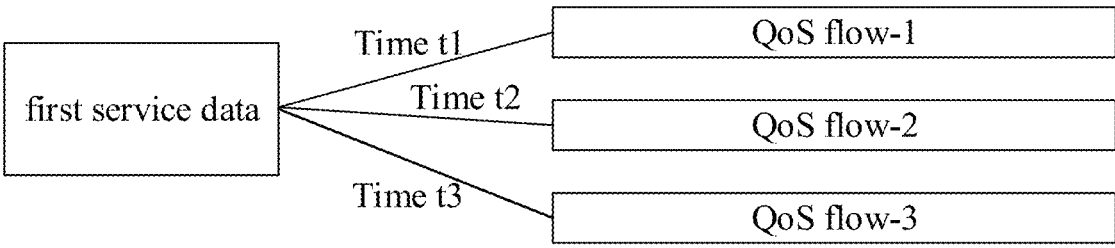
FIG. 6A is a schematic diagram of adjusting QoS flows at different time points provided by the embodiment of the present application.
Figure 6A:
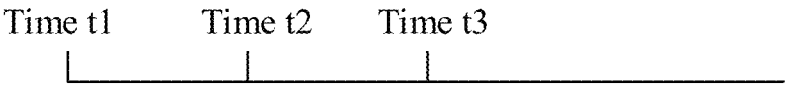

In an example, referring to FIG. 6A, the first condition information is used to indicate three time points, namely time t1, time t2, and time t3. The first parameter information is used to indicate that the rule that needs to be adjusted corresponding to time t1 is rule-1, the rule that needs to be adjusted corresponding to time t2 is rule-2, and the rule that needs to be adjusted corresponding to time t3 is rule-3. After the first device obtains the first information, it adjusts the connection corresponding to the first service data to QoS flow-1 from time t1 according to the rule-1, adjusts the connection corresponding to the first service data to QoS flow-2 from time t2 according the rule-2, and adjusts the connection corresponding to the first service data to QoS flow-3 from time t3 according to the rule-3.

Further, optionally, the at least one time point is periodic in time. Based on this, the first device periodically adjusts the connection corresponding to the first service data based on the first condition information and the second parameter information.

Figure 6B:
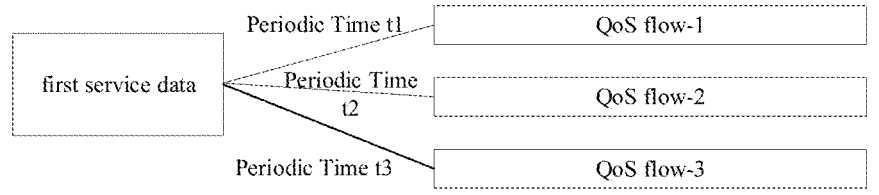
FIG. 6B is a schematic diagram of periodically adjusting QoS flows at different time points provided by the embodiment of the present application.
Figure 6B:
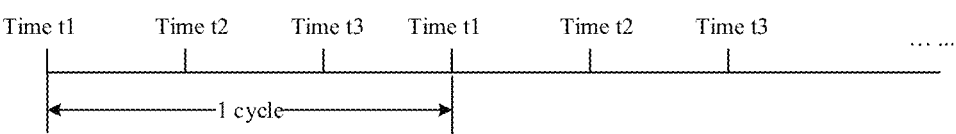

In one example, referring to FIG. 6B, the difference between FIG. 6B and FIG. 6A is that time t1, time t2, and time t3 are periodic, and the period length is T. It can be understood that the time t1 in the nth cycle is actually time t1+(n−1)T, the time t2 in the nth cycle is actually time t2+(n−1)T, and the time t3 in the nth cycle is actually is time t3+(n−1)T. For each period, the first device will adjust the connection. Specifically, in each period, the first device will adjust the connection corresponding to the first service data to the QoS flow-1 from time t1 according to the rule-1, adjust the connection corresponding to the first service data to QoS flow-2 from time t2 according to the rule-2, and adjust the connection corresponding to the first service data to QoS flow-3 from time t3 according to the rule-3.

In another case, the first condition information is used to determine at least one time period for adjustment; the second parameter information is used to determine the corresponding rule that needs to be adjusted in each time period of the at least one time period parameter. Based on this, the first device adjusts the connection corresponding to the first service data based on the first condition information and the second parameter information.

Figure 6C:
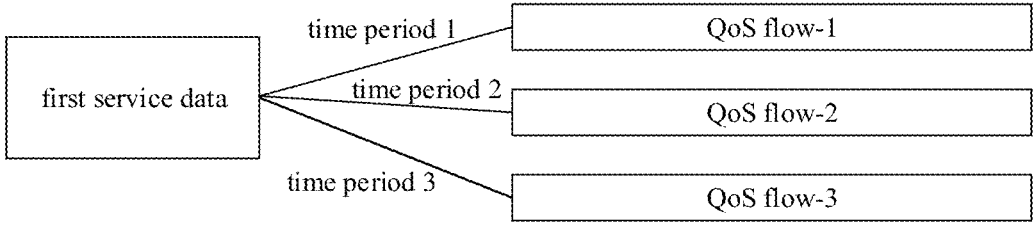
FIG. 6C is a schematic diagram of adjusting QoS flows in different time periods provided by the embodiment of the present application.
Figure 6C:
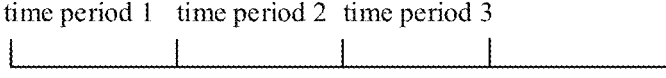

In an example, referring to FIG. 6C, the first condition information is used to indicate three time periods, namely time period 1, time period 2, and time period 3. The first parameter information is used to indicate that the rule that needs to be adjusted corresponding to time period 1 is rule-1, the rule that needs to be adjusted corresponding to time period 2 is rule-2, and the rule that needs to be adjusted corresponding to time period 3 is rule-3. After obtaining the first information, the first device adjusts the connection corresponding to the first service data to QoS flow-1 during time period 1 according to the rule-1, and adjusts the connection corresponding to the first service data to QoS flow-2 during time period 2 according to the rule-2, and adjusts the connection corresponding to the first service data to QoS flow-3 during time period 3 according to the rule-3.

Further, optionally, the at least one period of time is periodic in time. Based on this, the first device periodically adjusts the connection corresponding to the first service data based on the first condition information and the second parameter information.

Figure 6D:
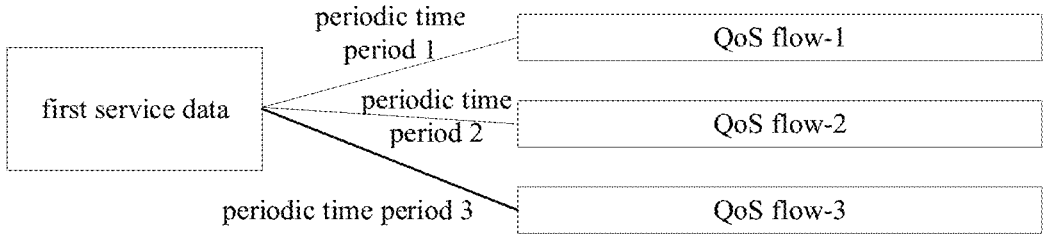
FIG. 6D is a schematic diagram of periodically adjusting QoS flows in different time periods provided by the embodiment of the present application.
Figure 6D:
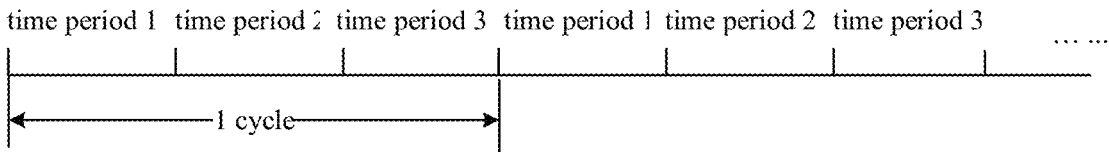

In one example, referring to FIG. 6D, the difference between FIG. 6D and FIG. 6C is that time period 1, time period 2, and time period 3 are periodic, and the period length is T. It can be understood that the start time of time period 1 in the nth cycle is actually time t1+(n−1)T, t1 is the start time of time period 1 in the first cycle; the start time of time period 2 in the nth cycle is actually time t2+(n−1)T, t2 is the start time of time period 2 in the first cycle; and the start time of time period 3 in the nth cycle is actually time t3+(n−1) T, t3 is the start time of time period 3 in the first cycle. For each cycle, the first device will adjust the transmission attribute parameters. Specifically, in each cycle, the first device will adjust the connection corresponding to the first service data to QoS flow-1 during time period 1 according to the rule-1, adjust the connection corresponding to the first service data to QoS flow-2 during time period 2 according to the rule 2, and adjust the connection corresponding to the first service data to QoS flow-3 during time period 3 according to the rule-3.

In some optional embodiments, the first information in the above embodiment is carried in the session establishment request reply message or the session modification request reply message.

Figure 7:
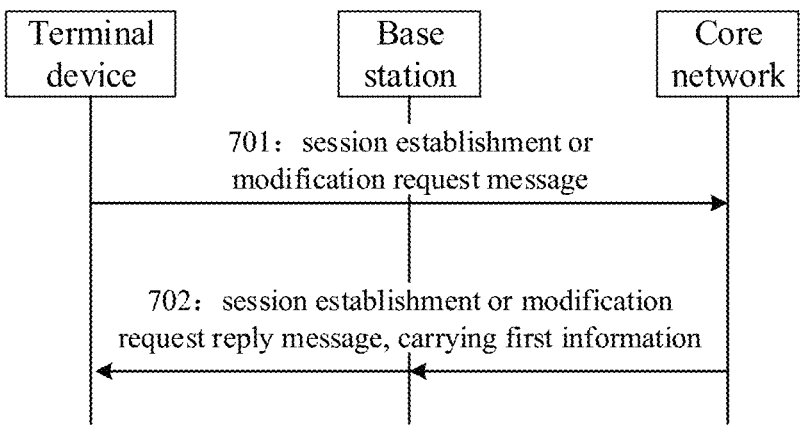
FIG. 7 is a schematic flowchart of session establishment or modification provided by the embodiment of the present application.

Referring to FIG. 7, FIG. 7 is a schematic flow chart of session establishment or modification, including the following steps:

Step 701: The terminal device sends a session establishment or modification request message to the core network.

In the embodiment, the core network may be a core network control plane network element. As an example, in 5GS, the first core network element is an SMF.

Step 702: The core network sends a session establishment or modification request reply message to the base station and/or the terminal device, and the message carries first information.

It should be noted that, the specific implementation of the first information may follow the description of the foregoing related embodiments.

It should be noted that, as an example, the session establishment or modification request message may be a PDU session establishment or modification request message, and the session establishment or modification request reply message may be a PDU session establishment or modification request reply message.

In the technical solution of the embodiment of the present application, on the one hand, the transmission attribute parameter corresponding to a connection will change, optionally, for example, it will change periodically. Therefore, in the session establishment or modification process, the core network will send the first information to the first device, and the first device adjusts transmission attribute parameters (such as QoS parameters) according to the first information. It should be noted that after the first device obtains the first information, it can automatically adjust the transmission attribute parameters according to the first information, and each adjustment does not require an instruction from the core network, nor does it need the first device to notify the core network.

According to the implementations of the embodiments of the present application, on one other hand, the rules (such as QoS rules, PDR) used to determine the binding relationship between the first service data and the connection will change, optionally, for example, periodically change. Since the change of the rule will cause the binding relationship between the first service data and the connection to change, it means that the connection corresponding to the first service data will change, optionally, for example, it will change periodically. Therefore, in the session establishment or modification process, the core network sends the first information to the first device, and the first device adjusts the connection of the first service data (e.g., the QoS flow) according to the first information. It should be noted that after the first device obtains the first information, it can automatically adjust the connection of the first service data according to the first information, and each adjustment does not require an instruction from the core network, nor does the first device need to notify the core network.

The technical solutions of the embodiments of the present application can provide a guarantee of high transmission quality for each terminal device within an appropriate time period, and rationally utilize wireless resources. In addition, the technical solution of the embodiment of the present application reuses the existing session establishment or modification process to issue the first information, which has little impact on the protocol and is easy to implement.

Figure 8:
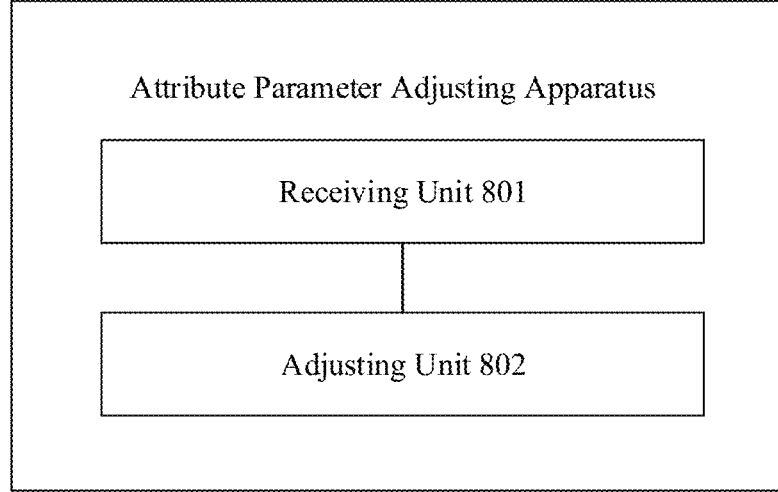
FIG. 8 is a schematic diagram of the structural composition of the apparatus for adjusting attribute parameter provided by the embodiment of the present application.

FIG. 8 is a schematic diagram 1 of the structural composition of the apparatus for adjusting attribute parameter provided by the embodiment of the present application, which is applied to the first device. As shown in FIG. 8, the apparatus for adjusting attribute parameter includes:

A receiving unit 801, configured to receive first information sent by a first core network element, wherein the first information is used by the first device to adjust a transmission attribute parameter corresponding to first service data.

In some optional embodiment, the first device is a terminal device, or a base station, or a second core network element.

In some optional embodiment, the first information includes:

first condition information, wherein the first condition information is used to determine an adjustment condition; and first parameter information, wherein the first parameter information is used to determine an adjusted transmission attribute parameter.

In some optional embodiment, the first condition information is used to determine at least one time point for adjustment; and the first parameter information is used to determine a transmission attribute parameter that needs to be adjusted corresponding to each time point in the at least one time point.

In some optional embodiment, the first condition information is used to determine at least one time period for adjustment; and the first parameter information is used to determine a transmission attribute parameter that needs to be adjusted corresponding to each time period of the at least one time period.

In some optional embodiment, the apparatus further includes:

an adjusting unit 802, configured to adjust the transmission attribute parameter of a connection corresponding to the first service data based on the first condition information and the first parameter information.

In some optional embodiment, the first information includes:

first condition information, wherein the first condition information is used to determine the adjustment condition; and second parameter information, wherein the second parameter information is used to determine a rule for adjustment, and the rule is used to determine a connection corresponding to the first service data.

In some optional embodiment, the first condition information is used to determine at least one time point for adjustment; and the second parameter information is used to determine a rule that needs to be adjusted corresponding to each time point in the at least one time point.

In some optional embodiment, the first condition information is used to determine at least one time period for adjustment; and the second parameter information is used to determine a rule that needs to be adjusted corresponding each time period of the at least one time period.

In some optional embodiment, the apparatus further includes:

an adjusting unit 802, configured to adjust the connection corresponding to the first service data based on the first condition information and the second parameter information.

In some optional embodiment, the at least one time point is periodic in time.

In some optional embodiment, the at least one time period is periodic in time.

In some optional embodiment, the first condition information includes at least one of:

at least one time point information for adjustment;

at least one time period information for adjustment; and cycle length information for adjustment.

In some optional embodiment, the first information is carried in a session establishment request reply message or a session modification request reply message.

Those skilled in the art should understand that the relevant description of the apparatus for adjusting attribute parameters in the embodiment of the present application can be understood with reference to the relevant description of the method for adjusting attribute parameters in the embodiment of the present application.

Figure 9:
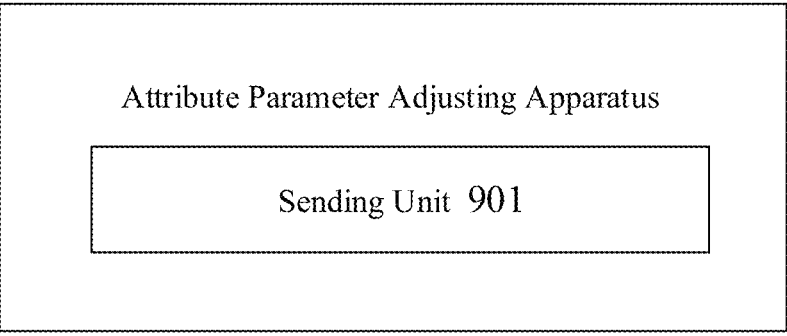
FIG. 9 is a second schematic diagram of the structural composition of the apparatus for adjusting attribute parameter provided by the embodiment of the present application.

FIG. 9 is a schematic diagram 2 of the structural composition of the apparatus for adjusting attribute parameter provided by the embodiment of the present application, which is applied to the first core network element. As shown in FIG. 9, the apparatus for adjusting attribute parameter includes:

a sending unit 901, configured to send first information to a first device, wherein the first information is used by the first device to adjust a transmission attribute parameter corresponding to first service data.

In some optional embodiment, the first device is a terminal device, or a base station, or a second core network element.

In some optional embodiment, the first information includes:

first condition information, wherein the first condition information is used to determine an adjustment condition; and first parameter information, wherein the first parameter information is used to determine an adjusted transmission attribute parameter.

In some optional embodiment, the first condition information is used to determine at least one time point for adjustment; and the first parameter information is used to determine a transmission attribute parameter that needs to be adjusted corresponding to each time point in the at least one time point.

In some optional embodiment, the first condition information is used to determine at least one time period for adjustment; and the first parameter information is used to determine a transmission attribute parameter that needs to be adjusted corresponding to each time period of the at least one time period.

In some optional embodiment, the first information includes:

first condition information, wherein the first condition information is used to determine the adjustment condition; and second parameter information, wherein the second parameter information is used to determine a rule for adjustment, and the rule is used to determine a connection corresponding to the first service data.

In some optional embodiment, the first condition information is used to determine at least one time point for adjustment; and the second parameter information is used to determine a rule that needs to be adjusted corresponding to each time point in the at least one time point.

In some optional embodiment, the first condition information is used to determine at least one time period for adjustment; and the second parameter information is used to determine a rule that needs to be adjusted corresponding each time period of the at least one time period.

In some optional embodiment, the at least one time point is periodic in time.

In some optional embodiment, the at least one time period is periodic in time.

In some optional embodiment, the first condition information includes at least one of:

at least one time point information for adjustment;

at least one time period information for adjustment; and cycle length information for adjustment.

Those skilled in the art should understand that the relevant description of the apparatus for adjusting attribute parameters in the embodiment of the present application can be understood with reference to the relevant description of the method for adjusting attribute parameters in the embodiment of the present application.

Figure 10:
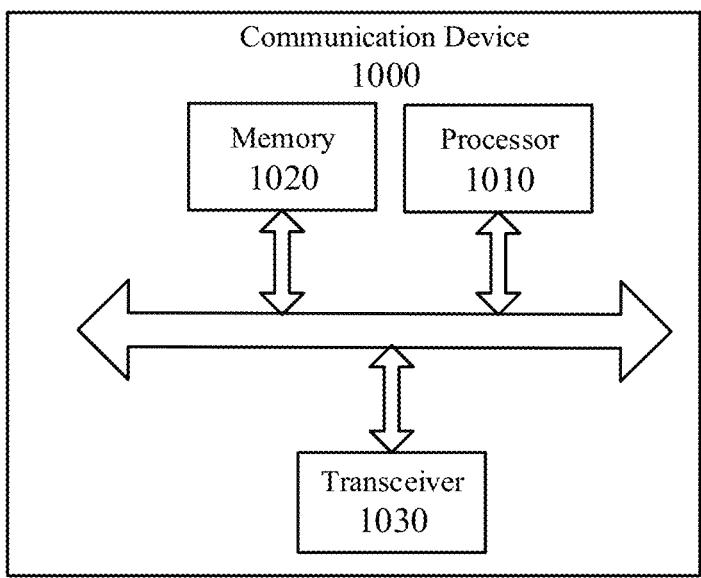
FIG. 10 is a schematic structural diagram of a communication device provided by an embodiment of the present application.

FIG. 10 is a schematic structural diagram of a communication device 1000 provided by an embodiment of the present application. The communication device may be a terminal device or a network device (such as a first core network element). The communication device 1000 shown in FIG. 10 includes a processor 1010, which can invoke and run a computer program from a memory, to implement the method in the embodiment of this application.

Optionally, as shown in FIG. 10, the communication device 1000 may further include a memory 1020. Wherein, the processor 1010 can invoke and run a computer program from the memory 1020, so as to implement the method in the embodiment of the present application.

In the embodiment, the memory 1020 may be a separate device independent of the processor 1010, or may be integrated in the processor 1010.

Optionally, as shown in FIG. 10, the communication device 1000 may further include a transceiver 1030, and the processor 1010 may control the transceiver 1030 to communicate with other devices, specifically, to send information or data to other devices, or receive information or data sent by other devices.

In the embodiment, the transceiver 1030 may include a transmitter and a receiver. The transceiver 1030 may further include antennas, and the number of antennas may be one or more.

Optionally, the communication device 1000 may specifically be the network device of the embodiment of the present application, and the communication device 1000 may implement the corresponding processes implemented by the network device in each method of the embodiment of the present application. For the sake of brevity, it will not be repeated here.

Optionally, the communication device 1000 may specifically be the mobile terminal/terminal device of the embodiment of the present application, and the communication device 1000 may implement the corresponding processes implemented by the mobile terminal/terminal device in each method of the embodiment of the present application. For the sake of brevity, it will not be repeated here.

Figure 11:
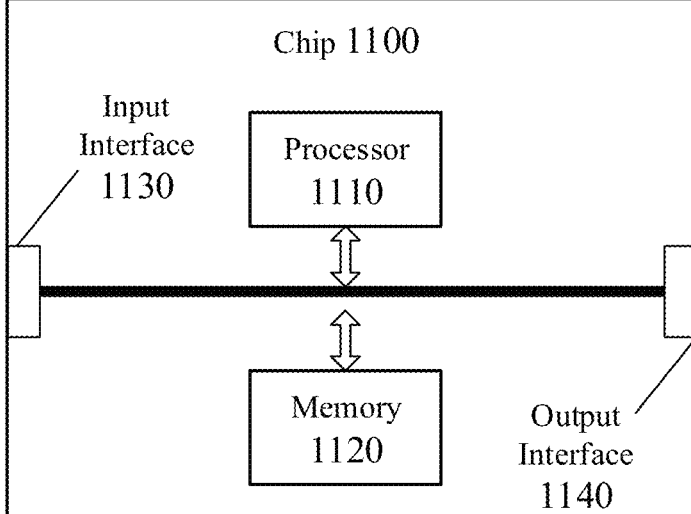
FIG. 11 is a schematic structural diagram of a chip according to an embodiment of the present application.

FIG. 11 is a schematic structural diagram of a chip according to an embodiment of the present application. The chip 1100 shown in FIG. 11 includes a processor 1110, and the processor 1110 can invoke and run a computer program from a memory, so as to implement the method in the embodiment of the present application.

Optionally, as shown in FIG. 11, the chip 1100 may further include a memory 1120. Wherein, the processor 1110 can invoke and run a computer program from the memory 1120, so as to implement the method in the embodiment of the present application.

In the embodiment, the memory 1120 may be a separate device independent of the processor 1110, or may be integrated in the processor 1110.

Optionally, the chip 1100 may further include an input interface 1130. Wherein, the processor 1110 can control the input interface 1130 to communicate with other devices or chips, specifically, can obtain information or data sent by other devices or chips.

Optionally, the chip 1100 may also include an output interface 1140. Wherein, the processor 1110 can control the output interface 1140 to communicate with other devices or chips, specifically, can output information or data to other devices or chips.

Optionally, the chip can be applied to the network device in the embodiment of the present application, and the chip can implement the corresponding processes implemented by the network device in the methods of the embodiment of the present application. For the sake of brevity, it will not be repeated here.

Optionally, the chip can be applied to the mobile terminal/terminal device in the embodiment of the present application, and the chip can implement the corresponding processes implemented by the mobile terminal/terminal device in the various methods of the embodiment of the present application. For the sake of brevity, it will not be repeated here.

It should be understood that the chip mentioned in the embodiment of the present application may also be called a system level chip, a system chip, a chip system, or a system-on-chip.

Figure 12:
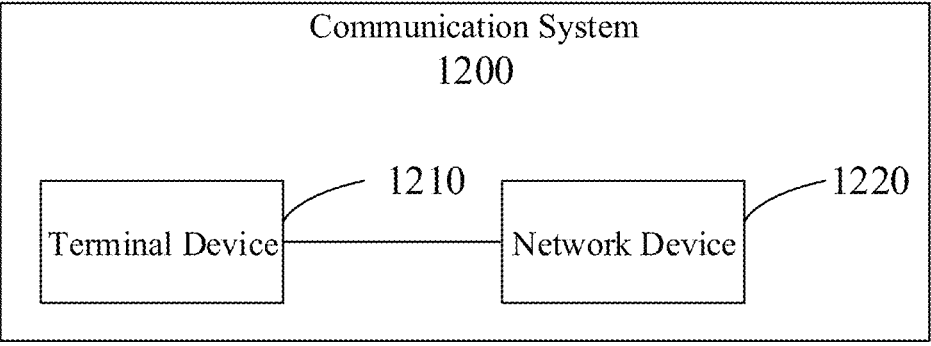
FIG. 12 is a schematic block diagram of a communication system provided by an embodiment of the present application.

FIG. 12 is a schematic block diagram of a communication system 1200 provided by an embodiment of the present application. As shown in FIG. 12, the communication system 1200 includes a terminal device 1210 and a network device 1220.

In the embodiment, the terminal device 1210 can be configured to realize the corresponding functions realized by the terminal device in the above method, and the network device 1220 can be configured to realize the corresponding functions realized by the network device in the above method.

It should be understood that, the processor of this embodiment of this application may be an integrated circuit chip, and has a signal processing capability. In an implementation process, steps in the foregoing method embodiments can be implemented by using a hardware integrated logical circuit in the processor or by using instructions in a form of software. The processor may be a general-purpose processor, a digital signal processor (DSP), an application-specific integrated circuit (ASIC), a field-programmable gate array (FPGA), another programmable logic device, a discrete gate or a transistor logic device, or a discrete hardware component. The processor may implement or perform methods, steps and logical block diagrams disclosed in this embodiment of this application. The general purpose processor may be a microprocessor or the processor may be any conventional processor or the like. The steps of the methods disclosed with reference to the embodiments of this application may be directly performed and completed by using a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the methods in combination with hardware thereof.

It can be understood that, the memory in this embodiment of this application may be a volatile memory or a nonvolatile memory, or may include both a volatile memory and a non-volatile memory. The non-volatile memory may be a read-only memory (ROM), a programmable ROM (PROM), an erasable programmable ROM (EPROM), an electrically EPROM (EEPROM), or a flash memory. The volatile memory may be a random access memory (RAM), and is used as an external cache. Through exemplary but not limitative description, RAMs in many forms may be used, for example, a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It should be noted that, the memory for the system and the method described herein intends to include, but not limited to, the memories and any other suitable types of memories.

It should be understood that, the foregoing description of the memory is illustrative, but is not limitative. For example, the memory in the embodiments of this application may be alternatively a static RAM (SRAM), a dynamic RAM (DRAM), a synchronous DRAM (SDRAM), a double data rate SDRAM (DDR SDRAM), an enhanced SDRAM (ES-DRAM), a synchlink SDRAM (SLDRAM), a direct rambus RAM (DR RAM), or the like. That is, the memory described in this embodiment of this application intends to include, but not limited to, the memories and any other suitable types of memories.

An embodiment of this application further provides a computer-readable storage medium, configured to store a computer program.

Optionally, the computer-readable storage medium may be applied to the network device in the embodiments of this application, and the computer program causes a computer to implement corresponding procedures implemented by the network device in the methods in the embodiments of this application. For brevity, details are not described herein again.

Optionally, the computer-readable storage medium may be applied to the mobile terminal/terminal device in the embodiments of this application, and the computer program causes a computer to implement corresponding procedures implemented by the mobile terminal/terminal device in the methods in the embodiments of this application. For brevity, details are not described herein again.

An embodiment of this application further provides a computer program product, including a computer program instruction.

Optionally, the computer program product may be applied to the network device in the embodiments of this application, and the computer program instruction causes a computer to implement corresponding procedures implemented by the network device in the methods in the embodiments of this application. For brevity, details are not described herein again.

Optionally, the computer program product may be applied to the mobile terminal/terminal device in the embodiments of this application, and the computer program instruction causes a computer to implement corresponding procedures implemented by the mobile terminal/terminal device in various methods in the embodiments of this application. For brevity, details are not described herein again.

An embodiment of this application further provides a computer program.

Optionally, the computer program may be applied to the network device in the embodiments of this application, and when run on a computer, the computer program causes the computer to implement corresponding procedures implemented by the network device in the methods in the embodiments of this application. For brevity, details are not described herein again.

Optionally, the computer program may be applied to the mobile terminal/terminal device in the embodiments of this application, and when run on the computer, the computer program causes the computer to implement corresponding procedures implemented by the mobile terminal/terminal device in the methods in the embodiments of this application. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

If implemented in the form of software functional units and sold or used as an independent product, the functions may also be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or some of the steps of the method embodiments of this application. The foregoing storage medium includes: any medium that can store program code, such as a universal serial bus (USB) flash disk, a removable hard disk, a ROM, a RAM, a magnetic disk, or an optical disc.

The descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for adjusting attribute parameter, comprising:
receiving, by a first device, first information sent by a first core network element, wherein the first information is used by the first device to adjust a transmission attribute parameter corresponding to first service data;
wherein the first information comprises:
first condition information, wherein the first condition information is used to determine an adjustment condition; and
first parameter information or a second parameter information, wherein the first parameter information is used to determine an adjusted transmission attribute parameter, and the second parameter information is used to determine a rule for adjustment, and the rule is used to determine a connection corresponding to the first service data.

2. The method according to claim 1, wherein the first device is a terminal device, or a base station, or a second core network element.

3. The method according to claim 1, wherein:
the first condition information is used to determine at least one time point for adjustment; and the first parameter information is used to determine a transmission attribute parameter that needs to be adjusted corresponding to each time point in the at least one time point, and the second parameter information is used to determine a rule that needs to be adjusted corresponding to each time point in the at least one time point; or
the first condition information is used to determine at least one time period for adjustment; and the first parameter information is used to determine a transmission attribute parameter that needs to be adjusted corresponding to each time period of the at least one time period, and the second parameter information is used to determine a rule that needs to be adjusted corresponding each time period of the at least one time period.

4. The method according to claim 1, wherein the method further comprises:
adjusting, by the first device, the transmission attribute parameter of a connection corresponding to the first service data based on the first condition information and the first parameter information; or
adjusting, by the first device, the connection corresponding to the first service data based on the first condition information and the second parameter information.

5. The method according to claim 3, wherein the at least one time point is periodic in time; and/or
wherein the at least one time period is periodic in time.

6. The method according to claim 1, wherein the first condition information comprises at least one of:
at least one time point information for adjustment;
at least one time period information for adjustment; and
cycle length information for adjustment.

7. The method according to claim 1, wherein the first information is carried in a session establishment request reply message or a session modification request reply message.

8. A method for adjusting attribute parameter, comprising:
sending, by a first core network element, first information to a first device, wherein the first information is used by the first device to adjust a transmission attribute parameter corresponding to first service data;
wherein the first information comprises:
first condition information, wherein the first condition information is used to determine an adjustment condition; and
first parameter information or second parameter information, wherein the first parameter information is used to determine an adjusted transmission attribute parameter, and the second parameter information is used to determine a rule for adjustment, and the rule is used to determine a connection corresponding to the first service data.

9. The method according to claim 8, wherein the first device is a terminal device, or a base station, or a second core network element.

10. The method according to claim 8, wherein:
the first condition information is used to determine at least one time point for adjustment; and the first parameter information is used to determine a transmission attribute parameter that needs to be adjusted corresponding to each time point in the at least one time point, and the second parameter information is used to determine a rule that needs to be adjusted corresponding to each time point in the at least one time point; or the first condition information is used to determine at least one time period for adjustment; and the first parameter information is used to determine a transmission attribute parameter that needs to be adjusted corresponding to each time period of the at least one time period, and the second parameter information is used to determine a rule that needs to be adjusted corresponding each time period of the at least one time period.

11. The method according to claim 10, wherein the at least one time point is periodic in time; and/or wherein the at least one time period is periodic in time.

12. The method according to claim 8, wherein the first condition information comprises at least one of:

at least one time point information for adjustment;

at least one time period information for adjustment; and cycle length information for adjustment.

13. The method according to claim 8, wherein the first information is carried in a session establishment request reply message or a session modification request reply message.

14. A communication device, comprising:

a processor and a memory, the memory is configured to store a computer program, the processor is configured to invoke and run the computer program stored in the memory, to execute a method for adjusting attribute parameter applied in a first device, the method comprising:

receiving, by the first device, first information sent by a first core network element, wherein the first information is used by the first device to adjust a transmission attribute parameter corresponding to first service data;

wherein the first information comprises:

first condition information, wherein the first condition information is used to determine an adjustment condition; and first parameter information or a second parameter information, wherein the first parameter information is used to determine an adjusted transmission attribute parameter, and the second parameter information is used to determine a rule for adjustment, and the rule is used to determine a connection corresponding to the first service data.

15. The communication device according to claim 14, wherein the first device is a terminal device, or a base station, or a second core network element.

16. The communication device according to claim 14, wherein:

the first condition information is used to determine at least one time point for adjustment; and the first parameter information is used to determine a transmission attribute parameter that needs to be adjusted corresponding to each time point in the at least one time point, and the second parameter information is used to determine a rule that needs to be adjusted corresponding to each time point in the at least one time point; or the first condition information is used to determine at least one time period for adjustment; and the first parameter information is used to determine a transmission attribute parameter that needs to be adjusted corresponding to each time period of the at least one time period, and the second parameter information is used to determine a rule that needs to be adjusted corresponding each time period of the at least one time period.

17. The communication device according to claim 14, wherein the processor is further configured to invoke and run the computer program stored in the memory to:

adjust, by the first device, the transmission attribute parameter of a connection corresponding to the first service data based on the first condition information and the first parameter information; or adjust, by the first device, the connection corresponding to the first service data based on the first condition information and the second parameter information.

* * * * *